US009121476B2

(12) United States Patent
Heglund et al.

(10) Patent No.: US 9,121,476 B2
(45) Date of Patent: Sep. 1, 2015

(54) CONTROL OF SHIFTING TRANSMISSION FOR CONSTANT AND VARIABLE FREQUENCY SYSTEMS

(71) Applicant: Hamilton Sundstrand Corporation, Charlotte, NC (US)

(72) Inventors: William S. Heglund, Byron, IL (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 246 days.

(21) Appl. No.: 13/861,801

(22) Filed: Apr. 12, 2013

(65) Prior Publication Data

US 2014/0309077 A1    Oct. 16, 2014

(51) Int. Cl.
*F16H 1/28*    (2006.01)
*F16H 3/52*    (2006.01)

(52) U.S. Cl.
CPC ... *F16H 1/28* (2013.01); *F16H 3/52* (2013.01)

(58) Field of Classification Search
CPC ..................................... F16H 1/28; F16H 3/52
See application file for complete search history.

(56) References Cited

U.S. PATENT DOCUMENTS

| 3,365,981 | A | * | 1/1968 | Gantzer | 475/77 |
| 3,733,924 | A | * | 5/1973 | Zentz et al. | 475/77 |
| 4,858,493 | A | * | 8/1989 | Cordner | 475/91 |
| 4,943,267 | A | * | 7/1990 | Sugden | 475/6 |
| 5,028,803 | A | * | 7/1991 | Reynolds | 290/31 |
| 5,125,806 | A | * | 6/1992 | Quick et al. | 417/423.6 |
| 6,527,660 | B1 | * | 3/2003 | Sugden | 475/77 |

FOREIGN PATENT DOCUMENTS

| EP | 2202395 | A2 | * | 6/2010 |
| GB | 1286728 | A | * | 8/1972 |

* cited by examiner

*Primary Examiner* — Tisha Lewis
(74) *Attorney, Agent, or Firm* — Locke Lord LLP; Scott D. Wofsy; Joshua L. Jones

(57) ABSTRACT

A transmission for providing mechanical power from an input includes a transmission assembly having an arm configured and adapted to be connected to a mechanical input for rotation at an input speed. A first planet is rotatably mounted to a first end of the arm. A trim ring operatively contacts the first planet for mutual rotation therewith. A brake is operatively connected to the trim ring for controlling rotation of the trim ring. A second planet is rotatably mounted to a second end of the arm. The second planet operatively contacts the first planet for mutual rotation therewith. An output ring operatively contacts the second planet for mutual rotation therewith to rotate at an output speed based on an input speed of the arm and a trim speed of the trim ring.

16 Claims, 3 Drawing Sheets

CONTROL OF SHIFTING TRANSMISSION FOR CONSTANT AND VARIABLE FREQUENCY SYSTEMS

BACKGROUND OF THE INVENTION

1. Field of the Invention

The present invention relates to transmission of mechanical power, and more particularly to transmission of mechanical power where a relatively constant output rate is desirable, such as in aircraft electrical power systems, for example.

2. Description of Related Art

A variety of devices can convert a variable mechanical input to a relatively constant rate for use in generating power at a relatively constant frequency. For example, in two stage gas turbine engines, aircraft electrical power can be produced by a generator powered by rotation of the high pressure spool. Generally, the high pressure spool has a more constant operational frequency than the low pressure spool. Even so, it is common to use a constant speed drive (CSD), or other continuously variable transmission, to regulate between the variable speed of the high pressure spool and the generator in order to keep the input to the generator more constant.

Aircraft are requiring more and more electrical power, and the amount of power that can be derived from typical high pressure spools is limited. Conventional constant speed drives and the like are also limited in that they can provide a constant output only if the input remains within a certain range. In some applications, variable frequency electrical systems can operate using variable inputs. But these also need the input to remain within a limited range.

Such conventional methods and systems have generally been considered satisfactory for their intended purpose. However, there is still a need in the art for systems and methods for supplying power that allow for improved range of input while still providing a relatively constant output. There also remains a need in the art for such systems and methods that are easy to make and use. The present invention provides a solution for these problems.

SUMMARY OF THE INVENTION

The subject invention is directed to a new and useful transmission for providing mechanical power from an input. The transmission includes a transmission assembly having an arm configured and adapted to be connected to a mechanical input for rotation at an input speed. A first planet is rotatably mounted to a first end of the arm. A trim ring operatively contacts the first planet for mutual rotation therewith. A brake is operatively connected to the trim ring for controlling rotation of the trim ring. A second planet is rotatably mounted to a second end of the arm. The second planet operatively contacts the first planet for mutual rotation therewith. An output ring operatively contacts the second planet for mutual rotation therewith to rotate at an output speed based on an input speed of the arm and a trim speed of the trim ring.

In certain embodiments, the brake is configured and adapted to shift the transmission assembly from a first condition in which the trim ring is held stationary relative to the arm, and a second condition in which the trim ring and arm rotate together. An overrunning clutch can operatively connect the arm to the trim ring to allow relative rotation of the arm and trim ring in the first condition and when shifting between the first and second conditions, and to allow common rotation of the arm and trim ring in the second condition, preventing rotation speed of the trim ring exceeding input rotation speed of the arm. A control loop can be operatively connected to the trim ring and the brake to command brake torque and thereby control trim ring rotation speed to maintain output speed of the output ring within a predetermined range when shifting between the first and second conditions.

In certain embodiments, the trim ring, first planet, second planet, and output ring have relative gear ratios operative to provide a normalized output speed at the output ring in the range of about 1 to 2.2 given a normalized input speed at the arm ranging from about 1 to 4.5 by shifting between the first and second conditions. It is also contemplated that the normalized output speed at the output ring can be in the range of about 1 to 2.3 given a normalized input speed at the arm ranging from about 1 to 5. It is also contemplated that the brake can be the only component that is actively controlled.

A continuously variable transmission can be operatively connected to the output ring to provide a substantially constant normalized output speed, which can be about 1 to 1 over a normalized input speed range of the arm from about 1 to 5 even as the brake shifts the transmission assembly between the first and second conditions. For example, the continuously variable transmission can be a constant speed drive (CSD).

In another aspect, the trim ring and first planet can be gears meshing as an internal gear set. The second planet can be a gear meshing with the first planet as an external gear set. The output ring can be a gear meshing with the second planet as an internal gear set.

The invention also provides a method of controlling output speed in a mechanical transmission system. The method includes sensing output and input speed of a transmission as described above. The method also includes commanding the brake in response to control rotation rate of the trim ring to maintain speed and acceleration of the output ring within a predetermined range when shifting the transmission from a first condition in which the trim ring is held stationary relative to the arm, and a second condition in which the trim ring and arm rotate together.

In certain embodiments, the method also includes sensing rotation rate of the trim ring and commanding the brake in response to control at least one of rotation speed and acceleration of the trim ring by application of the brake to maintain output speed and acceleration of the output ring within the predetermined range. Commanding the brake can include shifting the transmission between the first and second conditions to maintain a normalized output speed at the output ring in the range of about 1 to 2.2 given a normalized input speed at the arm ranging from about 1 to 4.5. It is also contemplated that the normalized output speed at the output ring can be maintained in the range of about 1 to 2.3 given a normalized input speed at the arm ranging from about 1 to 5. A continuously variable transmission can be operatively connected to the output ring, and the method can include providing a substantially constant normalized output speed from the continuously variable transmission of about 1 to 1 over a normalized input speed range of the arm from about 1 to 5 as the brake shifts between the first and second conditions.

In accordance with certain embodiments, commanding the brake can include maintaining at least one of rotation speed and acceleration of the output ring within the predetermined range wherein only the brake is actively controlled. It is also contemplated that commanding the brake can include commanding braking torque between the brake and the trim ring.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
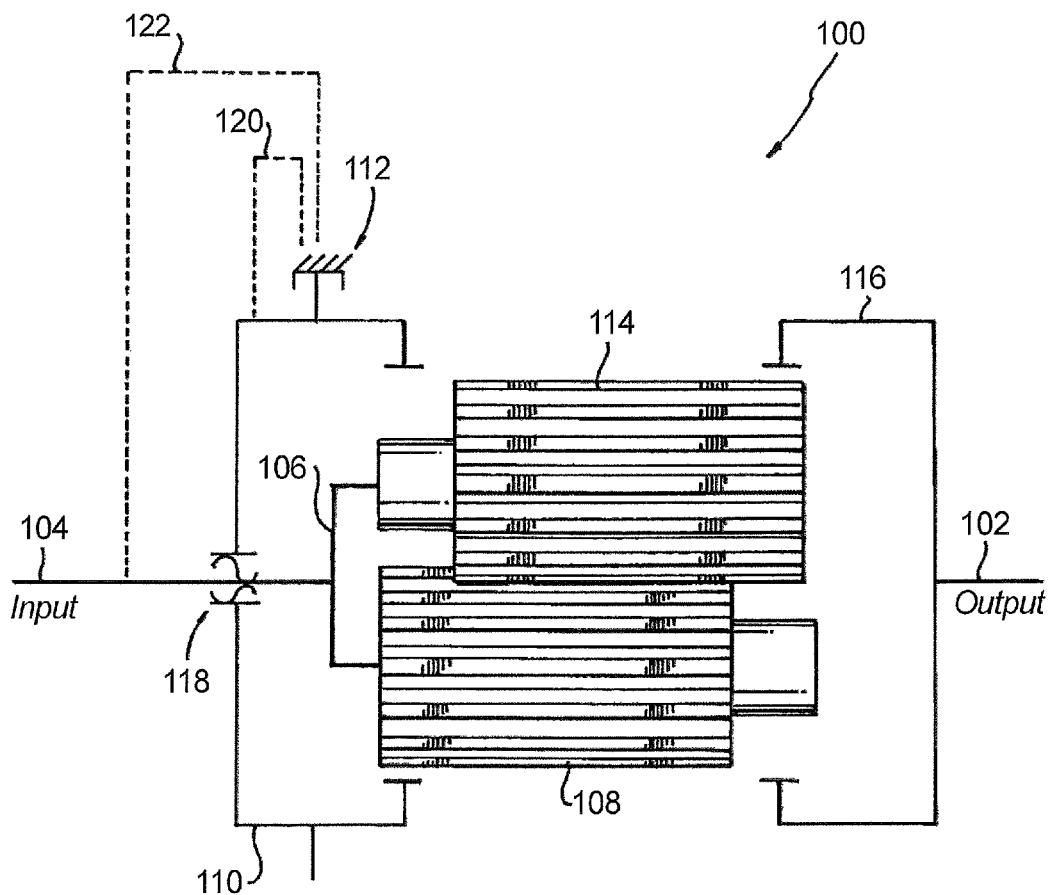
FIG. 1 is a schematic view of an exemplary embodiment of a transmission constructed in accordance with the present invention, showing the trim ring, planets, output ring, overrunning clutch, and the brake.

Reference will now be made to the drawings wherein like reference numerals identify similar structural features or aspects of the subject invention. For purposes of explanation and illustration, and not limitation, a partial view of an exemplary embodiment of a transmission in accordance with the invention is shown in FIG. 1 and is designated generally by reference character 100. Other embodiments of transmissions in accordance with the invention, or aspects thereof, are provided in FIGS. 2-3, as will be described. The systems and methods of the invention can be used to provide constant or variable output using mechanical power, for example from a low pressure spool in a gas turbine engine.

Referring now to FIG. 1, transmission 100 can provide mechanical power, e.g., rotational output at output shaft 102, from an input such as a rotating input at input shaft 104.

Transmission 100 includes a transmission assembly having an arm 106 connected to input shaft 104, which can in turn be connected to a mechanical input for rotation at an input speed. Input shaft 104 and arm 106 rotate together at the same speed, namely the input speed. A first planet 108 is rotatably mounted to a first end of arm 106. A trim ring 110 operatively contacts first planet 108 for mutual rotation therewith. A brake 112 is operatively connected to trim ring 110 for controlling rotation of trim ring 110. A second planet 114 is rotatably mounted to a second end of arm 106, e.g. opposite the first end where first planet 108 is mounted. Second planet 114 operatively contacts first planet 108 for mutual rotation therewith. An output ring 116 operatively contacts second planet 114 for mutual rotation therewith to rotate at an output speed based on the input speed of arm 106 and the trim speed of trim ring 110. In other words, two inputs determine the output speed at output shaft 102, namely the input speed at input shaft 104, and the speed of trim ring 110.

Brake 112 is used to shift the transmission assembly from a first condition in which trim ring 110 is held stationary relative to arm 106, and a second condition in which trim ring 110 and arm 106 rotate together at the same speed. An overrunning clutch 118 connects between arm 106 and trim ring 110 to allow relative rotation of arm 106 and trim ring 110 in the first condition. Overrunning clutch 118 also allows for relative rotation of arm 106 and trim ring 110 when transmission 100 is shifting between the first and second conditions. Overrunning clutch allows common rotation of arm 106 and trim ring 110 in the second condition and prevents rotation speed of trim ring 110 exceeding input rotation speed of arm 106.

In the exemplary embodiment shown in FIG. 1, trim ring 110 and first planet 108 are gears meshing as an internal gear set. Second planet 114 is a gear meshing with first planet 108 as an external gear set. Output ring 116 is a gear meshing with second planet 114 as an internal gear set. While shown and described in the exemplary context of gear sets, those skilled in the art will readily appreciate that rolling cylinders, belts, or any other suitable components can be used instead of gear sets, without departing from the scope of this disclosure.

The motion of the transmission assembly described above is governed by the following equations:

$$Nout = (1+k)*Nin - k*Ntrim$$

$$\frac{dNout}{dt} = (1+k)*\frac{dNin}{dt} - k*\frac{dNtrim}{dt}$$

wherein is the input speed, $N_{out}$ is the output speed, $N_{trim}$ is the speed of trim ring 110, $dN_{out}/dt$ is the acceleration of the output ring 116, $dN_{in}/dt$ is the acceleration of the input/arm 106, and $dN_{trim}/dt$ is the acceleration of trim ring 110.

The first condition, or first gear, is defined as when brake 112 is fully applied and trim ring 110 has a speed of zero. The second condition, or second gear, is defined as when brake 112 is fully released and trim ring 110 has a speed equal to the input speed, in other words, when trim ring 110 and arm 106 rotate together at the same speed. In this condition, the output speed is the same as the input speed for transmission 100.

When the input speed is increasing (dNin/dt is positive) and a shift from first gear to second gear is commanded (brake 112 is released), trim ring 110 increases in speed (dNtrim/dt is positive) due to the load on the system. From the second equation above, it can be seen that during such a shift, the trim ring acceleration opposes the input speed acceleration, resulting in reduced output acceleration at output ring 116.

When the input speed is decreasing (dNin/dt is negative) and a shift from second gear to first gear is commanded (brake 106 is applied), the speed of trim ring 110 decreases (dNtrim/dt is negative) due to the brake torque. From the second equation it can be seen that during such a shift the trim ring acceleration opposes the input speed deceleration, resulting in increased output speed at output ring 116.

Commanding the speed profile (acceleration) of trim ring 110 during a shift can allow for transmission 100 to meet typical CSD input acceleration requirements and the frequency rate of change requirements, for example when taking input power from a low pressure spool in a gas turbine engine. A typical CSD acceleration requirement is that there be no input acceleration beyond about 500 to 1500 rpm's per second.

A control loop 122 operatively connects input shaft 104 or arm 106 to brake 112 to control shifting speed of transmission 100 by application of brake 112 based on sensed speed and/or acceleration of the input and output to maintain output speed and/or acceleration of output ring 116 within a predetermined range. This control can also be applied during a transient or shift to maintain output speed and/or acceleration within a predetermined range.

A control loop 120 is operatively connected to trim ring 110 and to brake 112. Control loop 120 commands brake torque at brake 112 to control rotation speed and/or acceleration of trim ring 110 to maintain output speed of output ring 116 within a predetermined range when shifting between the first and second conditions. This also provides control of acceleration of output ring 116, e.g., to maintain acceleration within acceptable limits for a typical CSD. No other component besides brake 112 needs to be actively controlled.

Those skilled in the art will readily appreciate that these control loop configurations are exemplary only, and that any other suitable control scheme can be used without departing from the scope of the invention, such as using control pressure and/or trim speed as inputs for control. One benefit of using control loop 120, for example, is that it forms a relatively tight, high bandwidth control loop by sensing trim speed/acceleration and controlling it directly with brake 112.

It is contemplated that in constant frequency electrical systems, transmission 100 can be used in conjunction with a continuously variable transmission operatively connected to output ring 116 to provide a substantially constant normalized output speed. For example, if the normalized output speed of a system for constant frequency electrical power is about 1 to 1, the input to transmission 100 can have a normalized input speed range from about 1 to 5 even while brake 112 is shifting the transmission assembly between the first and second conditions. For example, the continuously variable transmission can be a constant speed drive (CSD) or any other suitable device.

Figure 2:
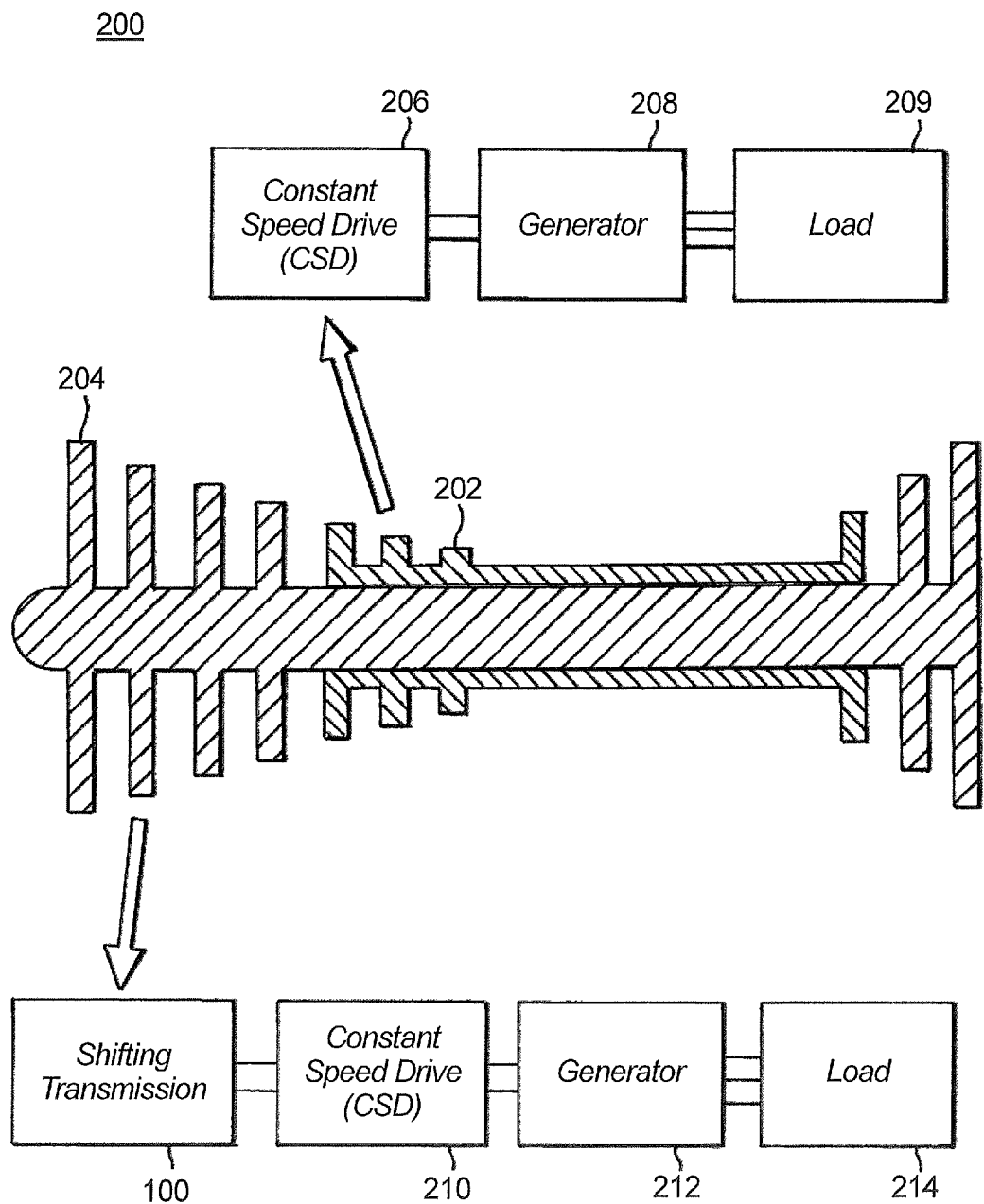
FIG. 2 is a schematic view of an exemplary embodiment of a power system constructed in accordance with the present invention, showing a transmission as in FIG. 1 connected between the low pressure spool and a constant speed drive (CSD) for providing constant frequency electrical power to the respective load.

With reference now to FIG. 2, a power system 200 includes a gas turbine engine having a high pressure spool 202 and a low pressure spool 204. A constant speed drive (CSD 206) takes variable frequency mechanical power from high pressure spool 202 and provides a substantially constant frequency output to turn generator 208. Generator 208 provides constant frequency electrical power to load 209, for example at 400 Hz. For example, the normalized speed of high pressure spool 202 can range from about 1 to 2.3. CSD 206 can provide a constant normalized output speed of 1 to 1 to generator 208 over that input range.

Low pressure spool 204 provides a second source of power by driving a shifting transmission 100, as described above. Transmission 100 connects between low pressure spool 204 and CSD 210. CSD 210 takes variable frequency mechanical power from the output of transmission 100 and provides a substantially constant frequency output to turn generator 212. Generator 212 provides constant frequency electrical power to load 214, for example at 400 Hz. For example, the normalized speed of low pressure spool 204 can range from about 1 to 5. By shifting as described above, transmission 100 can take the output of low pressure spool 204 over its entire operational range and provide an output in a normalized range of about 1 to 2.3. Thus, transmission 100 allows CSD 210, which has the same limitations on input range as CSD 206, to provide a constant normalized output speed of 1 to 1 to generator 212 over the input range of low pressure spool 204. In this exemplary configuration, trim ring 110, first planet 108, second planet 114, and output ring 116 have relative gear ratios operative to provide a normalized output speed at output ring 116 in the range of about 1 to 2.3 given a normalized input speed at arm 106 ranging from about 1 to 5 by shifting between the first and second conditions.

Figure 3:
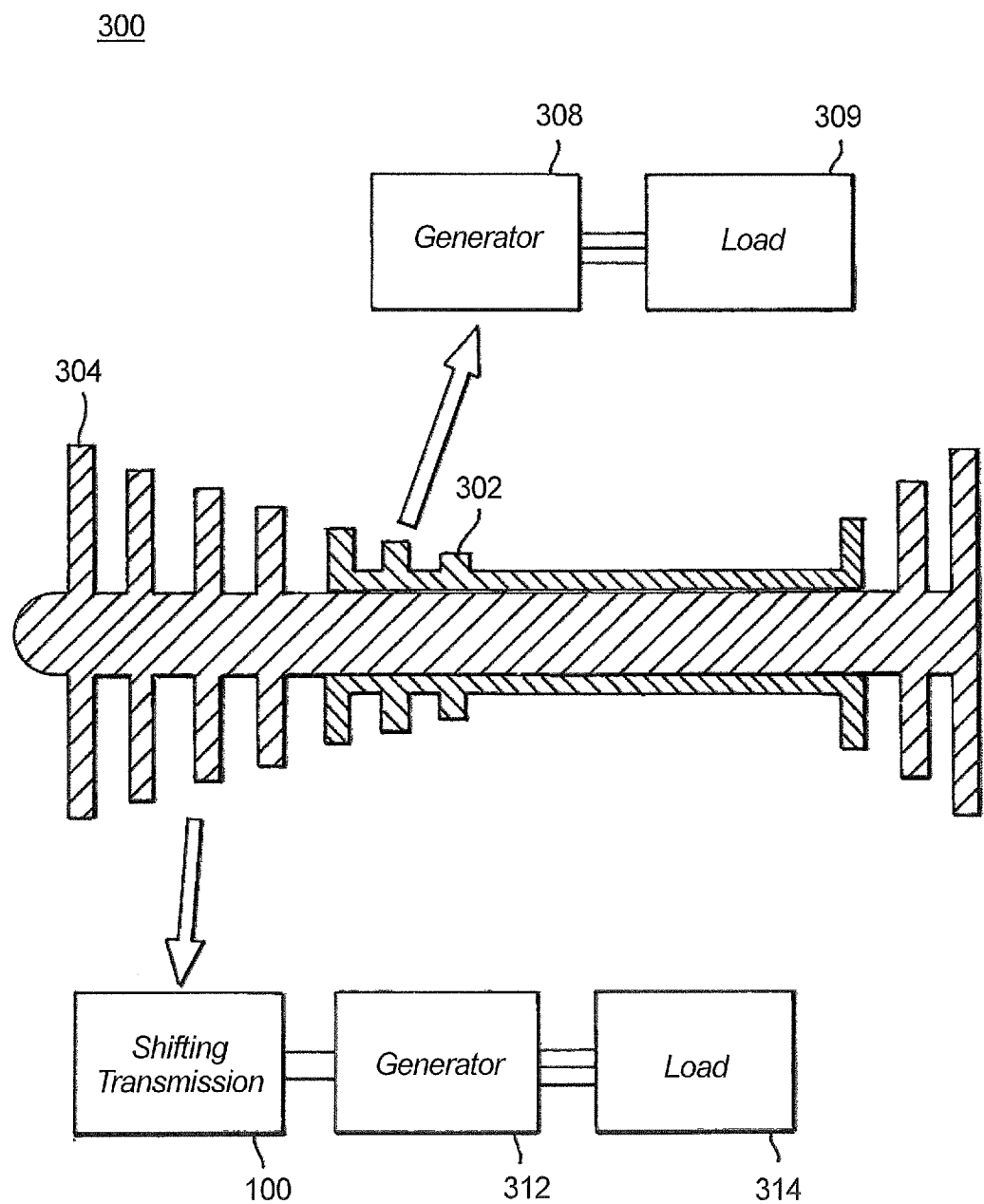
FIG. 3 is a schematic view of another exemplary embodiment of a power system constructed in accordance with the present invention, showing a transmission as in FIG. 1 connected between the low pressure spool and a generator for providing variable frequency electrical power to the respective load.

Referring now to FIG. 3, another exemplary power system 300 is shown for providing variable frequency electrical power. Power system 300 includes a gas turbine engine having a high pressure spool 302 and a low pressure spool 304, much as described above. High pressure spool 302 provides a variable frequency output to turn generator 308. Generator 308 provides variable frequency electrical power to load 309, ranging from about 360 Hz to about 800 Hz, for example over a normalized input speed from high pressure spool 302 ranging from about 1 to 2.2, for example.

Low pressure spool 304 provides a second source of power by driving a shifting transmission 100, as described above. Transmission 100 connects between low pressure spool 304 and generator 312. Generator 312 provides variable frequency electrical power to load 314, for example in the same range as generator 308 described above. For example, the normalized speed of low pressure spool 304 can range from about 1 to 4.5. By shifting as described above, transmission 100 can take the output of low pressure spool 304 over its entire range and provide an output in a normalized range of about 1 to 2.2. Thus, transmission 100 allows generator 312 to provide the same range of a variable frequency electrical power to load 314 as in load 309 described above, even though low pressure spool 304 provides a greater range of input speed than low pressure spool 302. In this exemplary configuration, trim ring 110, first planet 108, second planet 114, and output ring 116 have relative gear ratios operative to provide a normalized output speed at output ring 116 in the range of about 1 to 2.2 given a normalized input speed at arm 106 ranging from about 1 to 4.5 by shifting between the first and second conditions.

While shown and described above in the exemplary context of gas turbine engines for aircraft, those skilled in the art will readily appreciate that the systems and methods described herein can be used in any other suitable application. Those skilled in the art will readily appreciate that a hydraulically actuated brake or any other suitable type of brake can be used without departing from the scope of this disclosure.

The methods and systems of the present invention, as described above and shown in the drawings, provide for mechanical power transmission with superior properties including operability over an increased input frequency range while providing relatively constant and controlled output. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A transmission for providing mechanical power from an input comprising:
    a transmission assembly including an arm configured and adapted to be connected to a mechanical input for rotation at an input speed;
    a first planet rotatably mounted to a first end of the arm;
    a trim ring operatively contacting the first planet for mutual rotation therewith;
    a brake operatively connected to the trim ring for controlling rotation of the trim ring;
    a second planet rotatably mounted to a second end of the arm, wherein the second planet operatively contacts the first planet for mutual rotation therewith; and
    an output ring operatively contacting the second planet for mutual rotation therewith to rotate at an output speed based on an input speed of the arm and a trim speed of the trim ring, wherein the brake is configured and adapted to shift the transmission assembly from a first condition in which the trim ring is held stationary relative to the arm, and a second condition in which the trim ring and arm rotate together, further comprising an overrunning clutch operatively connecting the arm to the trim ring to allow relative rotation of the arm and trim ring in the first condition and when shifting between the first and second conditions, and to allow common rotation of the arm and trim ring in the second condition, preventing rotation speed of the trim ring exceeding input rotation speed of the arm.

2. A transmission for providing mechanical power from an input comprising:
- a transmission assembly including an arm configured and adapted to be connected to a mechanical input for rotation at an input speed;
- a first planet rotatably mounted to a first end of the arm;
- a trim ring operatively contacting the first planet for mutual rotation therewith;
- a brake operatively connected to the trim ring for controlling rotation of the trim ring;
- a second planet rotatably mounted to a second end of the arm, wherein the second planet operatively contacts the first planet for mutual rotation therewith; and
- an output ring operatively contacting the second planet for mutual rotation therewith to rotate at an output speed based on an input speed of the arm and a trim speed of the trim ring, wherein the brake is configured and adapted to shift the transmission assembly from a first condition in which the trim ring is held stationary relative to the arm, and a second condition in which the trim ring and arm rotate together, further comprising a control loop operatively connected to the trim ring and the brake to command brake torque and thereby control trim ring rotation speed to maintain output speed of the output ring within a predetermined range when shifting between the first and second conditions.

3. A transmission for providing mechanical power from an input comprising:
- a transmission assembly including an arm configured and adapted to be connected to a mechanical input for rotation at an input speed;
- a first planet rotatably mounted to a first end of the arm;
- a trim ring operatively contacting the first planet for mutual rotation therewith;
- a brake operatively connected to the trim ring for controlling rotation of the trim ring;
- a second planet rotatably mounted to a second end of the arm, wherein the second planet operatively contacts the first planet for mutual rotation therewith; and
- an output ring operatively contacting the second planet for mutual rotation therewith to rotate at an output speed based on an input speed of the arm and a trim speed of the trim ring, wherein the brake is configured and adapted to shift the transmission assembly from a first condition in which the trim ring is held stationary relative to the arm, and a second condition in which the trim ring and arm rotate together, further comprising a control loop operatively connecting the arm to the brake to control shifting speed for shifting between the first and second conditions by application of the brake to maintain output of the output ring within a predetermined range of at least one of speed and acceleration.

4. A transmission for providing mechanical power from an input comprising:
- a transmission assembly including an arm configured and adapted to be connected to a mechanical input for rotation at an input speed;
- a first planet rotatably mounted to a first end of the arm;
- a trim ring operatively contacting the first planet for mutual rotation therewith;
- a brake operatively connected to the trim ring for controlling rotation of the trim ring;
- a second planet rotatably mounted to a second end of the arm, wherein the second planet operatively contacts the first planet for mutual rotation therewith; and
- an output ring operatively contacting the second planet for mutual rotation therewith to rotate at an output speed based on an input speed of the arm and a trim speed of the trim ring, wherein the brake is configured and adapted to shift the transmission assembly from a first condition in which the trim ring is held stationary relative to the arm, and a second condition in which the trim ring and arm rotate together, wherein the trim ring, first planet, second planet, and output ring have relative gear ratios operative to provide a normalized output speed at the output ring in the range of about 1 to 2.2 given a normalized input speed at the arm ranging from about 1 to 4.5 by shifting between the first and second conditions.

5. A transmission for providing mechanical power from an input comprising:
- a transmission assembly including an arm configured and adapted to be connected to a mechanical input for rotation at an input speed;
- a first planet rotatably mounted to a first end of the arm;
- a trim ring operatively contacting the first planet for mutual rotation therewith;
- a brake operatively connected to the trim ring for controlling rotation of the trim ring;
- a second planet rotatably mounted to a second end of the arm, wherein the second planet operatively contacts the first planet for mutual rotation therewith; and
- an output ring operatively contacting the second planet for mutual rotation therewith to rotate at an output speed based on an input speed of the arm and a trim speed of the trim ring, wherein the brake is configured and adapted to shift the transmission assembly from a first condition in which the trim ring is held stationary relative to the arm, and a second condition in which the trim ring and arm rotate together, wherein the trim ring, first planet, second planet, and output ring have relative gear ratios operative to provide a normalized output speed at the output ring in the range of about 1 to 2.3 given a normalized input speed at the arm ranging from about 1 to 5 by shifting between the first and second conditions.

6. A transmission for providing mechanical power from an input comprising:
- a transmission assembly including an arm configured and adapted to be connected to a mechanical input for rotation at an input speed;
- a first planet rotatably mounted to a first end of the arm;
- a trim ring operatively contacting the first planet for mutual rotation therewith;
- a brake operatively connected to the trim ring for controlling rotation of the trim ring;
- a second planet rotatably mounted to a second end of the arm, wherein the second planet operatively contacts the first planet for mutual rotation therewith; and
- an output ring operatively contacting the second planet for mutual rotation therewith to rotate at an output speed based on an input speed of the arm and a trim speed of the trim ring, wherein the brake is configured and adapted to shift the transmission assembly from a first condition in which the trim ring is held stationary relative to the arm, and a second condition in which the trim ring and arm rotate together, further comprising a continuously variable transmission operatively connected to the output ring to provide a substantially constant normalized output speed of about 1 to 1 over a normalized input speed range of the arm from about 1 to 5 even as the brake shifts the transmission assembly between the first and second conditions.

7. A transmission as recited in claim 6, wherein the continuously variable transmission is a constant speed drive.

8. A method of controlling output speed in a mechanical transmission system, the method comprising:
sensing at least input speed of a transmission for providing mechanical power from an input including:
- a transmission assembly including an arm configured and adapted to be connected to a mechanical input for rotation at an input speed;
- a first planet rotatably mounted to a first end of the arm;
- a trim ring operatively contacting the first planet for mutual rotation therewith;
- a brake operatively connected to the trim ring for controlling rotation of the trim ring;
- a second planet rotatably mounted to a second end of the arm, wherein the second planet operatively contacts the first planet for mutual rotation therewith; and
- an output ring operatively contacting the second planet for mutual rotation therewith to rotate at an output speed based on an input speed of the arm and a trim speed of the trim ring; and
- commanding the brake in response to control rotation rate of the trim ring to maintain rotation speed and acceleration of the output ring within a predetermined range when shifting the transmission from a first condition in which the trim ring is held stationary relative to the arm, and a second condition in which the trim ring and arm rotate together.

9. A method as recited in claim 8, further comprising:
sensing rotation rate of the output ring; and
commanding the brake in response to control at least one of rotation speed and acceleration of the trim ring by application of the brake to maintain at least one of output speed and acceleration of the output ring within the predetermined range.

10. A method as recited in claim 8, wherein commanding the brake includes shifting the transmission between the first and second conditions to maintain a normalized output speed at the output ring in the range of about 1 to 2.2 given a normalized input speed at the arm ranging from about 1 to 4.5.

11. A method as recited in claim 8, wherein commanding the brake includes shifting the transmission between the first and second conditions to maintain a normalized output speed at the output ring in the range of about 1 to 2.3 given a normalized input speed at the arm ranging from about 1 to 5.

12. A method as recited in claim 8, wherein commanding the brake includes maintaining at least one of rotation speed and acceleration of the output ring within the predetermined range wherein only the brake is actively controlled.

13. A method as recited in claim 8, wherein a continuously variable transmission is operatively connected to the output ring, and further comprising providing a substantially constant normalized output speed from the continuously variable transmission of about 1 over a normalized input speed range of the arm from about 1 to 5 as the brake shifts between the first and second conditions.

14. A method as recited in claim 8, wherein commanding the brake includes commanding braking torque between the brake and the trim ring.

15. A method of controlling output speed in a mechanical transmission system, the method comprising:
sensing at least input speed of a transmission for providing mechanical power from an input including:
- a transmission assembly including an arm configured and adapted to be connected to a mechanical input for rotation at an input speed;
- a first planet rotatably mounted to a first end of the arm;
- a trim ring operatively contacting the first planet for mutual rotation therewith;
- a brake operatively connected to the trim ring for controlling rotation of the trim ring;
- a second planet rotatably mounted to a second end of the arm, wherein the second planet operatively contacts the first planet for mutual rotation therewith; and
- an output ring operatively contacting the second planet for mutual rotation therewith to rotate at an output speed based on an input speed of the arm and a trim speed of the trim ring; and
- commanding the brake in response to control rotation rate of the trim ring to maintain rotation speed and deceleration of the output ring within a predetermined range when shifting the transmission from a second condition in which the trim ring and arm rotate together, and a first condition in which the trim ring is held stationary relative to the arm.

16. A method as recited in claim 15, further comprising:
sensing rotation rate of the output ring; and
commanding the brake in response to control at least one of rotation speed and deceleration of the trim ring by application of the brake to maintain at least one of output speed and deceleration of the output ring within the predetermined range.

\* \* \* \* \*